US012790166B2

(12) United States Patent
Kanteti

(10) Patent No.: US 12,790,166 B2
(45) Date of Patent: Nov. 10, 2026

(54) SYSTEM AND METHOD FOR AUTOMATICALLY CALLING ELEVATOR/S

(71) Applicant: HONEYWELL INTERNATIONAL INC., Charlotte, NC (US)

(72) Inventor: Neeraja Kanteti, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1181 days.

(21) Appl. No.: 17/251,455

(22) PCT Filed: Jun. 30, 2020

(86) PCT No.: PCT/IB2020/056178
§ 371 (c)(1),
(2) Date: Dec. 11, 2020

(87) PCT Pub. No.: WO2021/009598
PCT Pub. Date: Jan. 21, 2021

(65) Prior Publication Data

US 2022/0127108 A1 Apr. 28, 2022

(30) Foreign Application Priority Data

Jul. 12, 2019 (IN) ............................ 201911028099

(51) Int. Cl.
*B66B 1/34* (2006.01)
*B66B 1/46* (2006.01)

(52) U.S. Cl.
CPC ............ *B66B 1/3461* (2013.01); *B66B 1/468* (2013.01); *B66B 2201/232* (2013.01);
(Continued)

(58) Field of Classification Search
CPC . B66B 1/3461; B66B 1/468; B66B 2201/232; B66B 2201/4615; B66B 2201/4638; B66B 2201/4653
(Continued)

(56) References Cited

U.S. PATENT DOCUMENTS

2019/0100405 A1* 4/2019 Scoville ................ B66B 1/3415

FOREIGN PATENT DOCUMENTS

WO 2007093665 A1 8/2007
WO 2013191705 A1 12/2013
(Continued)

OTHER PUBLICATIONS

Kuenzi et al. (WO 2018213008 A1) System and Method for Calling Elevator (Year: 2018).*
(Continued)

*Primary Examiner* — Jorge L Carrasquillo
(74) *Attorney, Agent, or Firm* — Seager, Tufte & Wickhem, LLP

(57) ABSTRACT

Aspects of the invention are directed towards a system and a method for automatically calling an elevator. One or more embodiments of the invention describe a method comprising steps of receiving, from an accessing device, a state of the accessing device associated with the premises and prompting a user of a user device to provide information based on the state. The method further comprising step of transmitting a request to the accessing device for automatically calling an elevator based on the information provided by the user.

14 Claims, 6 Drawing Sheets

(52) U.S. Cl.
CPC ................. *B66B 2201/4615* (2013.01); *B66B 2201/4638* (2013.01); *B66B 2201/4653* (2013.01)

(58) Field of Classification Search
USPC .......................................................... 187/247
See application file for complete search history.

(56) References Cited

FOREIGN PATENT DOCUMENTS

| | | | |
|---|---|---|---|
| WO | 2015094178 | A1 | 6/2015 |
| WO | 2018213008 | A1 | 11/2018 |

OTHER PUBLICATIONS

Depaola et al. (WO 2013191705 A1)System and Method for Controlling Elevator System Access (Year: 2013).*
Peterson (WO 2015094178 A1) Elevator Control With Mobile Devices (Year: 2015).*
Wang (CN 108275547 A) An Elevator Emergency Communication Management System And Method (Year: 2018).*
International Search Report for application PCT/IB2020/056178, dated Nov. 16, 2020, 4 pages.
Written Opinion for application PCT/IB2020/056178, dated Nov. 16, 2020, 7 pages.

* cited by examiner

SYSTEM AND METHOD FOR AUTOMATICALLY CALLING ELEVATOR/S

CROSS REFERENCE TO RELATED APPLICATIONS

This application is a National Stage application of PCT/IB2020/056178, filed Jun. 30, 2020, which claims the benefit of IN application No. 201911028099, filed Jul. 12, 2019, both of which are incorporated by reference in their entirety herein.

TECHNICAL FIELD OF INVENTION

The present invention relates generally to elevator systems. More particularly, the invention relates to a system and method for automatically calling an elevator.

BACKGROUND OF THE INVENTION

At present, most of the buildings have elevators which are used by various visitors or guests of the buildings to reach a destination floor. The elevators in the buildings save visitor's time to reach the floor and are much preferred over stairs of the building which the visitors have to manually climb to reach the floor in the building.

In order to take the elevator for reaching the destination floor in the building, the visitor/guest has to first reach the location in the building where the elevator is situated. Then, the user has to press a button to call the elevator and has to wait until the elevator reaches to the floor where the visitor is waiting for the elevator. Such steps consume visitor's precious time and require the visitor to wait for the arrival of the elevator. Hotel guests typically use elevators whenever they exit room and there is always a waiting time.

In view of afore-mentioned problems, there is a need of effective a system and method for calling a elevator of a building. If the elevator arrives to the floor as guest exits room and by the time guest walks to the elevator, if its already there, then lot of waiting time is reduced. There is also a need of a system and method for automatically calling the elevator that does not require the visitors or guests of the building to wait for a elevator. In order to solve the problems in the existing art, systems and methods are disclosed for automatically calling the elevator that addresses the afore-mentioned problems.

SUMMARY OF THE INVENTION

Various embodiments of the invention describe a method and a system for automatically calling an elevator. The invention discloses a method comprising the steps of advertising a state of an accessing device associated with premises and transmitting the state of the accessing device to a user device. The accessing device receives a request along with information provided by a user to call an elevator after transmitting the state. Also, the accessing device transmits the request and the information to a server for automatically calling the elevator.

In an embodiment of the invention, the state associated with the accessing device includes an open state and a close state of the accessing device.

In another embodiment of the invention, the information includes input provided by the user in response to a prompt by the user device.

In a further embodiment of the invention, the accessing device receives the request along with the information and communicates the request along with the information to the server through a service network.

In yet another embodiment of the invention, the server communicates with a third party provider to initiate calling of the elevator based on the information.

In yet another embodiment of the invention, the invention discloses a method comprising the steps of receiving, from an accessing device, a state of the accessing device associated with the premises and prompting a user of a user device to provide information in response to receiving of the state. The user device transmits a request along with the information provided by the user to the accessing device for automatically calling an elevator.

In a different embodiment of the invention, the user device estimates a time for the user to reach the elevator.

In an embodiment of the invention, the state associated with the accessing device includes an open state or a close state of the accessing device.

In another embodiment of the invention, the information includes input provided by the user in response to a prompt by the user device.

In a further embodiment of the invention, the prompt includes one or more questions posed to the user with respect to the state.

In yet another embodiment of the invention, the questions posed to the user include a question related to use of the elevator, a question related to exit from the premises, a question related to a destination floor of the user, or a question related to using any facility in the premises.

In yet another embodiment of the invention, a system is disclosed that comprises an accessing device and a user device. The accessing device includes a transceiver configured to advertise a state of the accessing device associated with premises and to transmit the state of the accessing device to a user device. The user device includes a receiver configured to receive, from the transceiver of the accessing device, a state associated with the accessing device. The user device also includes an interface configured to prompt a user of the user device to provide information in response to receiving of the state. The user device further includes a transmitter configured to transmit a request along with the information provided by the user to the accessing device for automatically calling an elevator.

In an embodiment of the invention, the state associated with the accessing device includes an open state or a close state of the accessing device.

In another embodiment of the invention, the information includes input provided by the user in response to a prompt by the user device.

In a further embodiment of the invention, the prompt includes one or more questions posed to the user with respect to the state. The questions posed to the user include a question related to use of the elevator, a question related to exit from the premises, a question related to a destination floor of the user, or a question related to using any facility in the premises In yet another embodiment of the invention, the accessing device receives the request along with the information and communicates the request along with the information to the server through a service network. Also, the server communicates with a third party provider to initiate calling of the elevator based on the information.

In various other embodiments of the invention, a computer readable medium is disclosed comprising one or more processors and a memory coupled to the one or more processors. The memory stores instructions which are executed by the one or more processors to advertise a state of an accessing device associated with premises and transmit the state of the accessing device to a user device. The memory also stores instructions which are executed by the one or more processors to receive a request along with information provided by a user from the user device to call an elevator after transmitting the state and transmit the request and the information to a server for automatically calling the elevator.

In various other embodiments of the invention, a computer readable medium is disclosed comprising one or more processors and a memory coupled to the one or more processors. The memory stores instructions which are executed by the one or more processors to receive, from an accessing device, a state of the accessing device associated with the premises and to prompt a user of a user device to provide information in response to receiving of the state. The memory also stores instructions which are executed by the one or more processors to transmit a request along with the information provided by the user to the accessing device for automatically calling an elevator.

This summary is provided to introduce a selection of concepts in a simplified form from that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
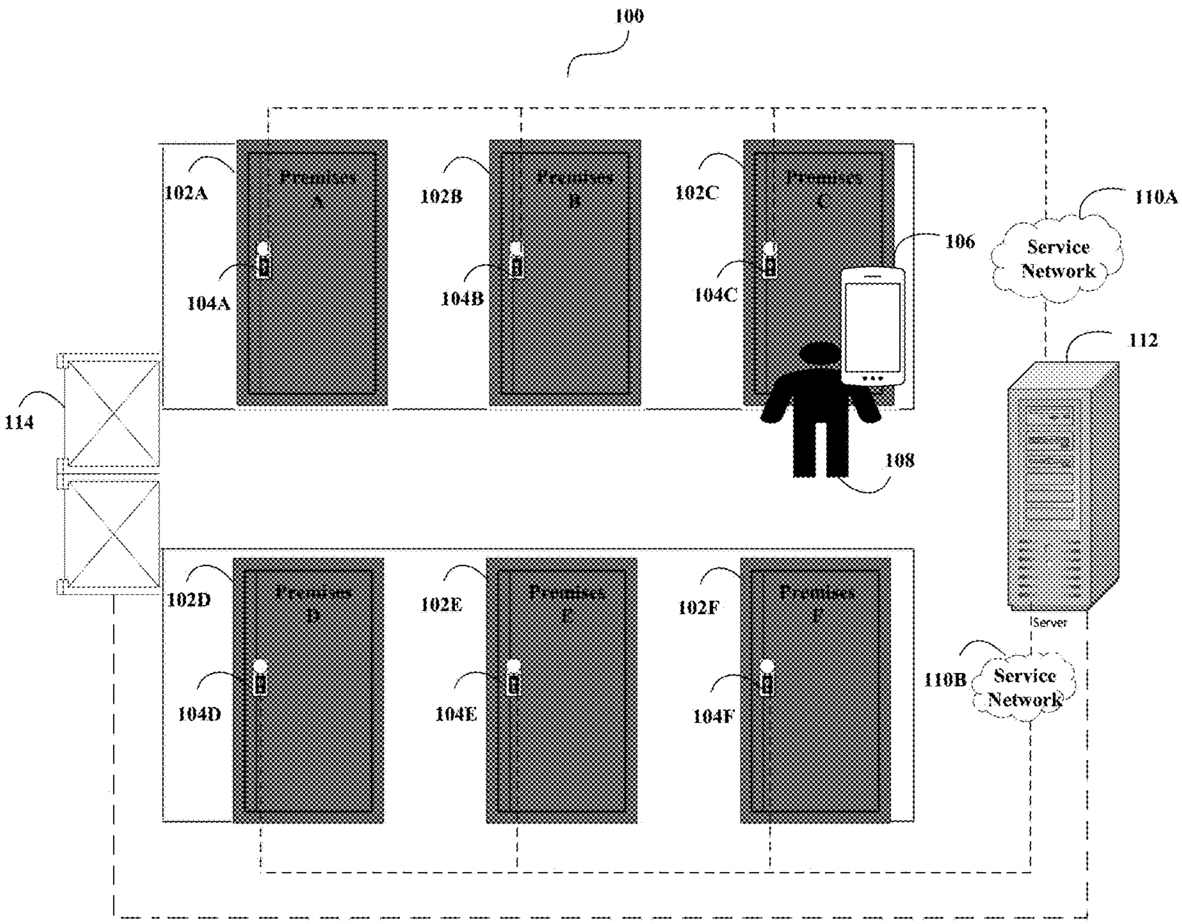
FIG. 1 depicts an exemplary architecture for automatically calling an elevator, according to an exemplary embodiment of the invention.

Described herein is a technology for a system and method for automatically calling an elevator. The elevator is automatically called by using a server when the accessing device receives a request from a user device. The request is based on information provided by a user of the user device.

As used herein, the elevator may be installed in a building. Such elevator may be electric-driven or other means-driven transportation unit that carries people, cargo or anything from a floor in a building to another floor of the premises/building.

As used herein, the user device may be a desktop computer or a hand held device such as a mobile phone with network connectivity. Example of the user equipment includes a desktop, workstation PC, a laptop, a smart phone, a tablet, a wearable device and the like.

As used herein, the accessing device may be installed on a premises and may comprise a short-range transceiver, a cellular transceiver, a status detector, a keypad, a processor and a memory. The accessing device may be a lock, smart lock, a door handle with a lock, an electro-mechanical lock or any such device that is understood by a person skilled in the art, Also, the premises can be a room with a door or a floor where the accessing device can be installed.

As used herein, the server is a remote or cloud storage which is connected to the accessing device using a service network and also connected to the elevator system.

The server may be connected to the elevator system via a third party service.

Throughout the specification, reference numeral 102 depicts one or more premises. The reference numeral 102A, 102B, 102C . . . 102F may each be considered as a single premises. Likewise, reference numeral 104 depicts one or more accessing devices. The reference numeral 104A, 104B, 104C . . . 104F may each be considered as one accessing device.

FIG. 1 depicts an exemplary architecture 100 for automatically calling an elevator, according to an exemplary embodiment of the invention. The exemplary architecture 100 comprises one or more premises 102, one or more accessing devices 104 installed along with each of the premises 102, a server 112 connected with a service network 110, a user 108 associated with a user device 106 and an elevator 114.

Considering a situation that the user 108 with the user device 106 moves inside or outside the premises 102C, the accessing device 104C installed on the premises 102C may detect a status of the accessing device 104C associated with premises 102C. Once the accessing device 104C detects the state of the accessing device 104C, the accessing device 104C may start advertising the detected state. Further, the accessing device 104C may also establish a connection with the user device 106 and may get connected with the user device 106. In an embodiment, the user device 106 may be communicably coupled with the accessing device 104C using a short-range network. Such short-range network may be a bluetooth network, a WiFi network, a ZigBee network or any such network known in the art. In another embodiment, the user device 106 may be connected with the accessing device 104C using a cellular network. Such cellular network may be a GSM network, LTE network, or any other cellular network known in the art. As used herein, the state of the accessing device 104C includes, but is not limited to, an open state or a close state of the accessing device 104C. The close state of the accessing device 104C may be a state when the accessing device 104C is engaged/coupled/connected with the premises 102C. The entrance of the premises 102C is closed in the close state of the accessing device 104C. Similarly, the open state of the accessing device 104C may be a state when the accessing device 104C is dis-engaged/uncoupled/dis-connected with the premises 102C. The entrance of the premises 102C is opened in the dis-enagaged state of the accessing device 104C. These states are advertised by the accessing device 104C for transmission to the user device 106.

After the connection is established between the accessing device 104C and the user device 106, the accessing device 104C may transmit the state of the accessing device 104 to the user device 106. The user device 106 receives the state of the accessing device 104 and in response to receiving of the state of the accessing device 104C, the user device 106 may then prompt the user 108 to provide information. As used herein, the prompt may include a set of questionnaires.

In response to the prompt, the user 108 may provide information to the user device 106. Such information includes inputs/answers provided by the user 108. Then, the user device 106 may transmit a request along with the information provided by the user 108 to the accessing device 104C to call the elevator 114. When the accessing device 104C receives the request from the user device 106 to call the elevator 114, the accessing device 104C may transmit the request along with the information provided by the user 108 to the server 112 through the service network 110. Based on the request and the information from the accessing device 104C, the server 112 sends a call to the elevator 114 and accordingly, the elevator 114 automatically reaches a desired floor. As used herein, the service network may be a network provided by an owner of the premises 102 and used to connect the server 112 with the accessing device 104. In an alternative embodiment, the server 112 communicates with a third party provider to initiate calling of the elevator 114 based on the information. Although the present invention has been described using an exemplary situation where the user 108 is moving inside or outside the premise 102C; however, it is well understood for any person that the user 108 may move inside or outside of any other premise 102A/102B/102D/102E/102F. Further, the present invention has been described considering the accessing device 102C communicates with the server 112 or the user device 106; however, it is well understood for any person that the any accessing device 104A/104B/104D/104E/104F communicates with the server 112 or the user device 106.

Figure 2:
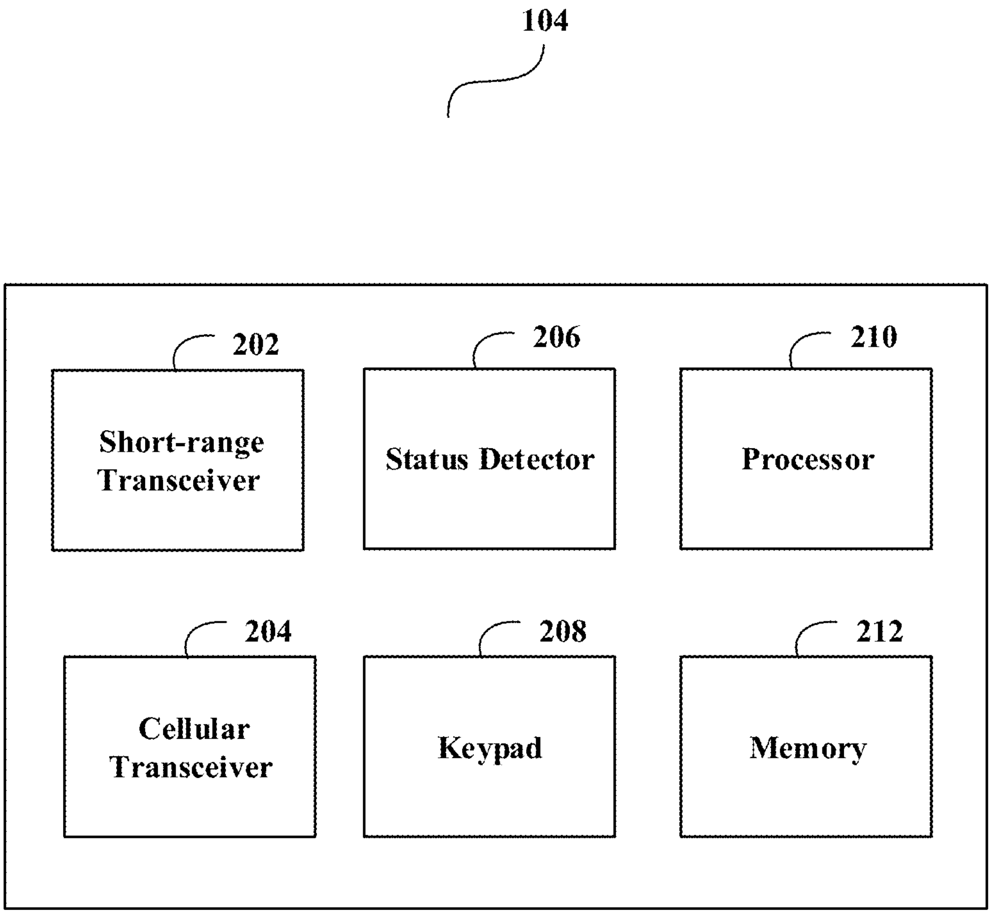
FIG. 2 depicts block diagram of different components in an accessing device according to an exemplary embodiment of the invention.

FIG. 2 depicts block diagram of different components in an accessing device 104 according to an exemplary embodiment of the invention. The accessing device 104 comprises a short-range transceiver 202, a cellular transceiver 204, a status detector 206, a keypad 208, a processor 210 and a memory 212. The status detector 206 of the accessing device 104C is configured to detect a state of the accessing device 104C. The short-range transceiver 202 is configured to advertise the detected state of the accessing device 104C and to establish a communication between the accessing device 104C and the user device 106. Further, the short-range transceiver 202 is also configured to transmit the state of the accessing device 104C to the user device 106. Alternatively, the cellular transceiver 204 can also be used and may be configured to transmit the state of the accessing device 104C to the user device 106. Moreover, the short-range transceiver 202 is also configured to receive a request along with information provided by the user 108 from the user device 106 to call the elevator 114. Further, the cellular transceiver 204 or the short-range transceiver 202 is further configured to transmit the request to the server 112 for automatically calling the elevator 114. The keypad 208 of the accessing device 104C may have alphanumeric soft or hard buttons and may be configured to receive inputs from the user 108. The memory 212 of the accessing device 104C is configured to store an identifier associated with the accessing device 104C and/or an identifier associated with the premises 102C.

Figure 3:
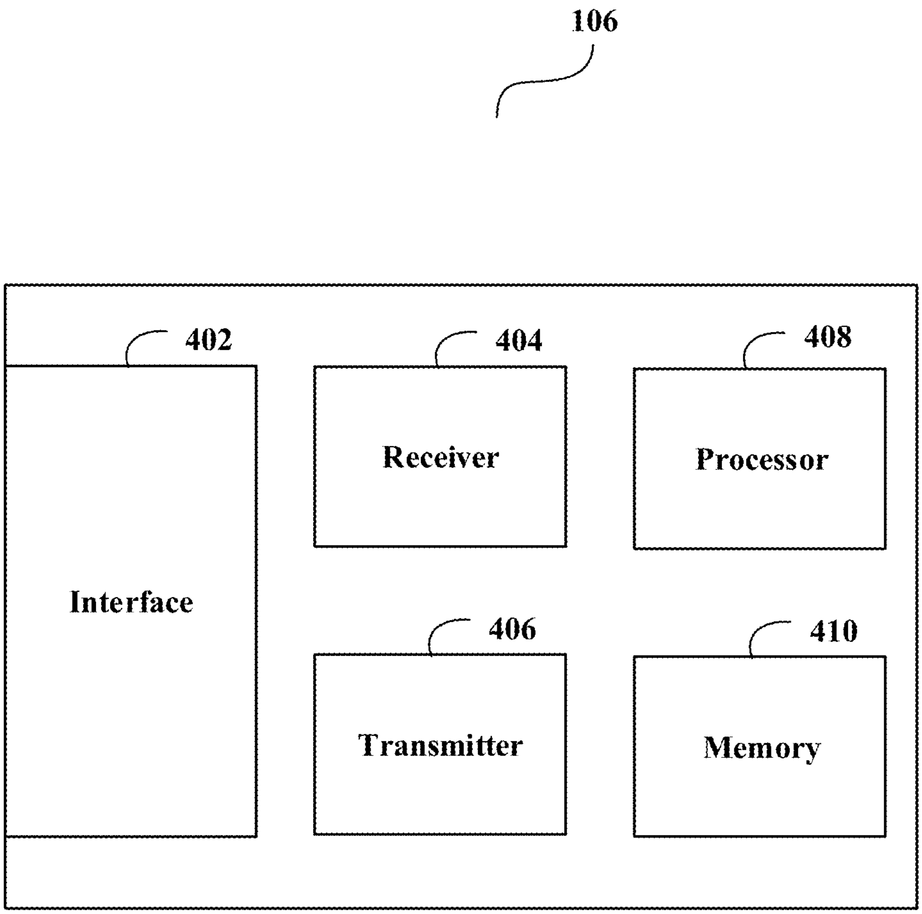
FIG. 3 depicts block diagram of different components in a user device according to an exemplary embodiment of the invention.

FIG. 3 depicts block diagram of different components in a user device 106 according to an exemplary embodiment of the invention. The user device 106 comprises an interface 402, a receiver 404, a transmitter 406, a processor 408 and a memory 410. The receiver 404 is configured to receive, from the transceiver 202/204 of the accessing device 104C, a state of the accessing device 104C associated with the premises 102C. When the receiver 404 receives the state from the accessing device 104C, the interface 402 of the user device 106 is configured to prompt the user 108 to provide information. In response to the prompt, the user 108 may provide information to the user device 106 using the interface 402. Then, the transmitter 406 is configured to send a request along with the information provided by the user 108 to the accessing device 104C to call the elevator 114. The memory 410 is configured to store one or more applications which may perform all or any of the functions and operations as described herein.

Figure 4:
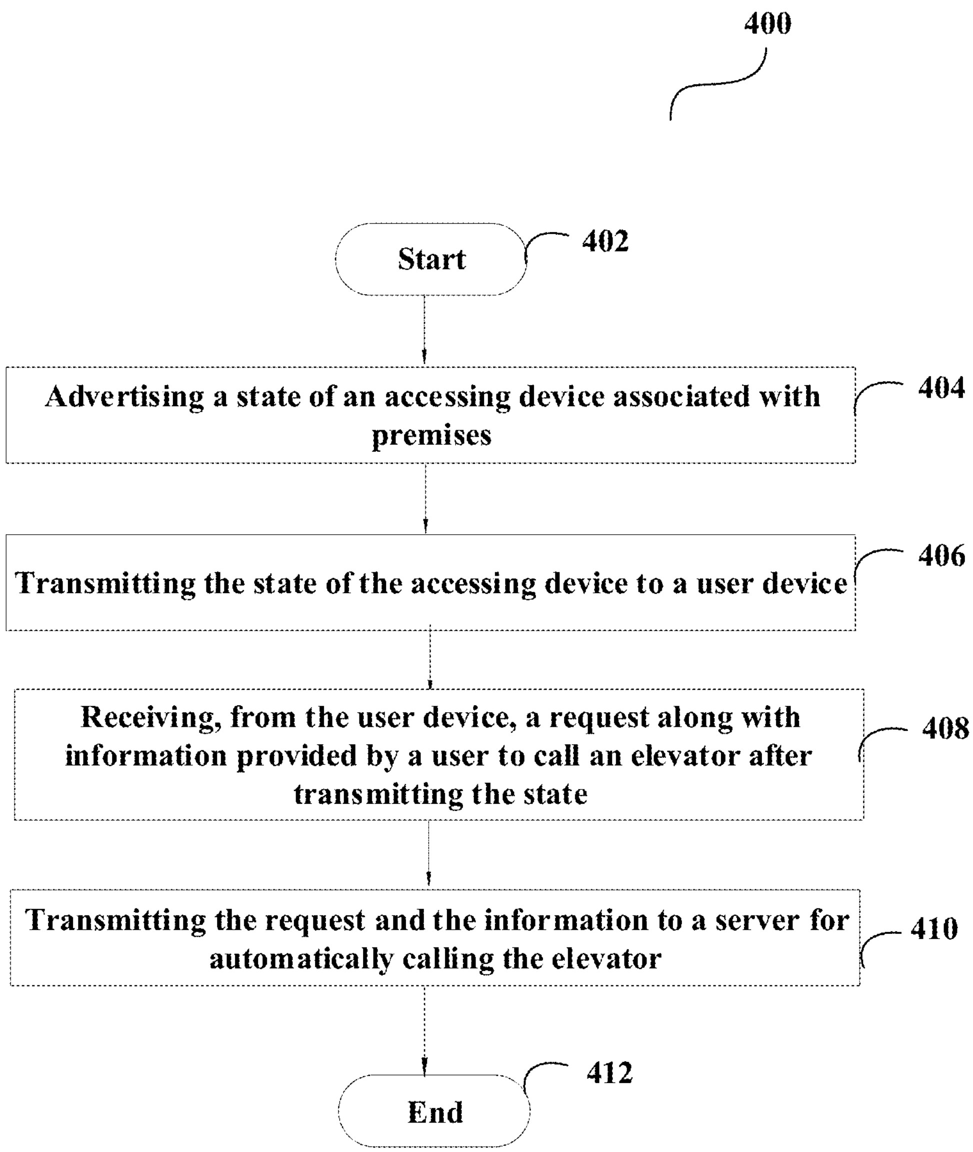
FIG. 4 depicts an exemplary flowchart illustrating a method to perform the invention according to an exemplary embodiment of the invention.

FIG. 4 depicts an exemplary flowchart illustrating a method to perform the invention according to an exemplary embodiment of the invention. The method flowchart 400 describes a method being performed for enabling the invention. The method flowchart 400 starts at step 402.

At step 404, the accessing device 104C installed on the premises 102C may detect a status of the accessing device 104C associated with premises 102C. Also, when the accessing device 104C detects the state of the accessing device 104C, the accessing device 104C may start advertising the detected state of the accessing device 104C associated with the premises 102C.

At step 406, when the connection is established between the accessing device 104C and the user device 106, the accessing device 104C may transmit the state of the accessing device 104 to the user device 106 using the short-range network.

At step 408, the accessing device 104C may receive a request along with information provided by a user 108 from the user device 106 to automatically call the elevator 114.

At step 410, the accessing device 104C transmits the request and the information to the server 112 through the service network 110 to call the elevator 114. The method flowchart ends at 412.

Figure 5:
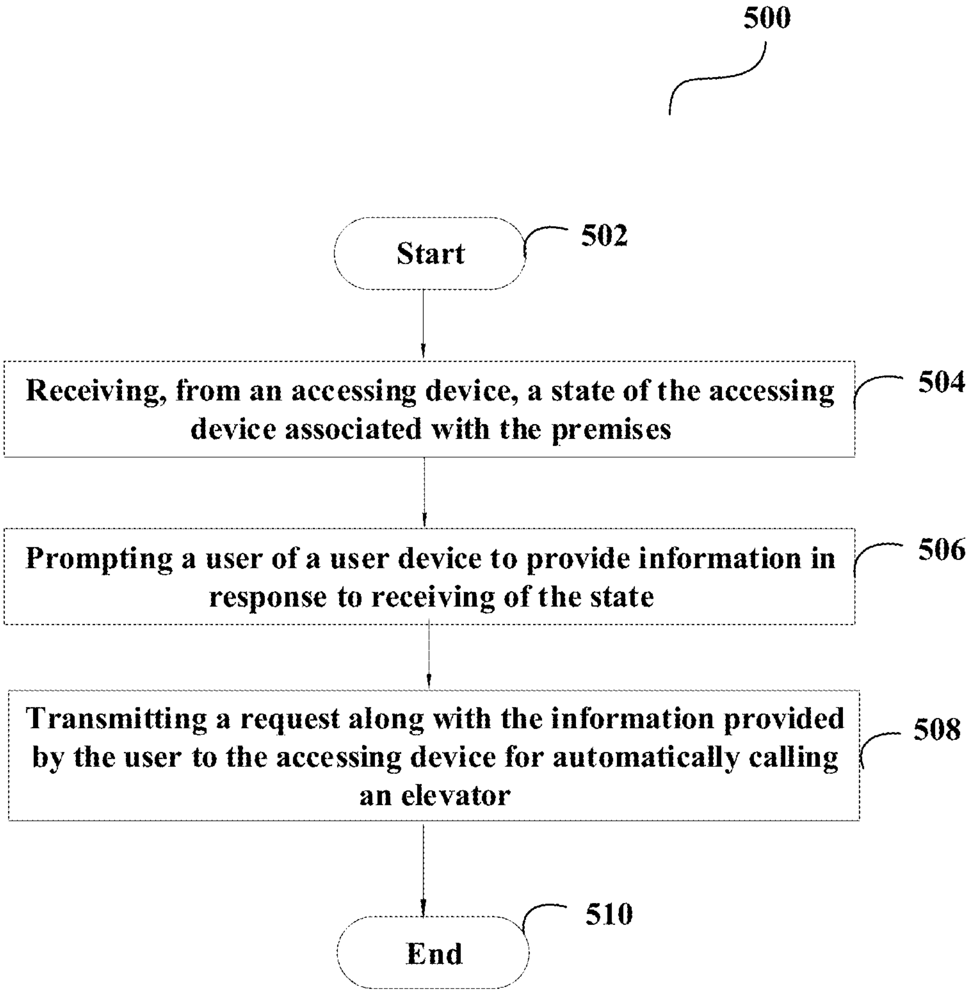
FIG. 5 depicts an exemplary flowchart illustrating a method to perform the invention according to an exemplary embodiment of the invention.

FIG. 5 depicts an exemplary flowchart illustrating a method to perform the invention according to an exemplary embodiment of the invention. The method flowchart 500 describes a method being performed for enabling the invention. The method flowchart 500 starts at step 502.

At step 504, the user device 106 receives a state of the accessing device 104C associated with the premises 102C from the accessing device 104C.

At step 506, the user device 106 may then prompt to the user 108 to provide information in response to receiving of the state. In response to such prompt, the user 108 may provide information to the user device 106.

At step 508, the user device 106 may transmit a request with the information provided by the user 108 to the accessing device 104C to automatically call an elevator 114. The method flowchart ends at 510.

Figure 6:
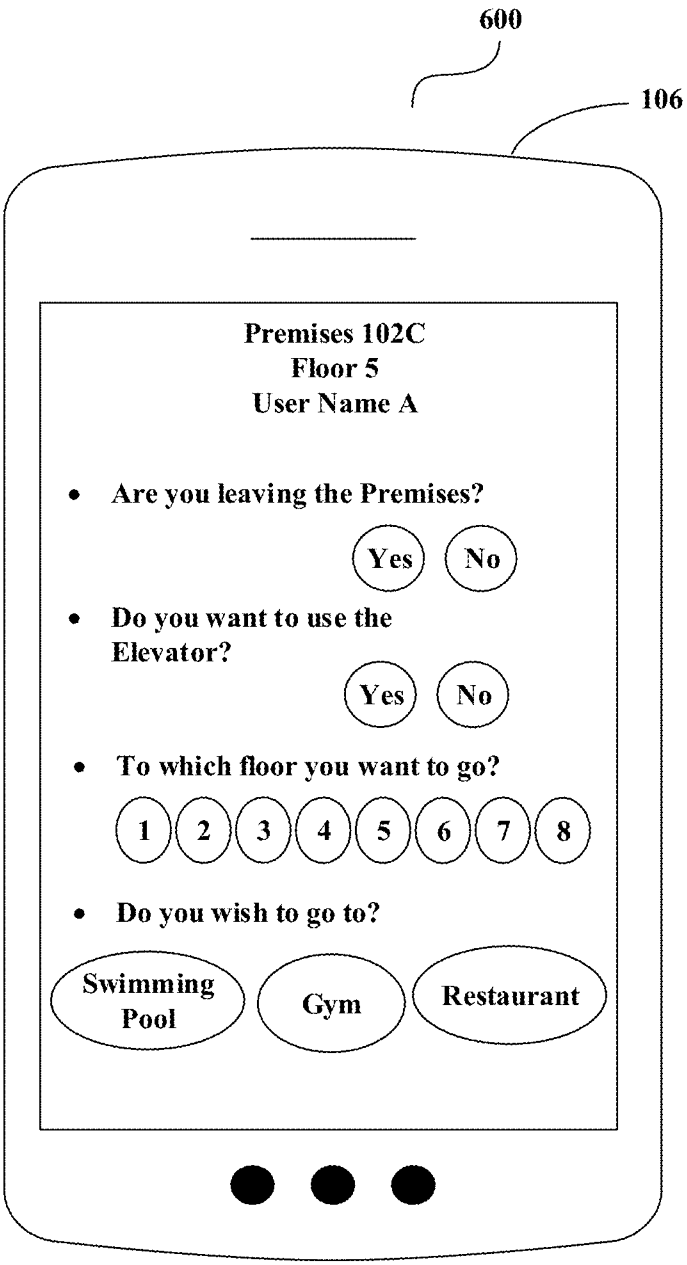
FIG. 6 depicts an exemplary prompt/s provided to a user according to an exemplary embodiment of the invention.

FIG. 6 depicts an exemplary prompt 600 with exemplary questions for the user to provide infromation. The questions incudes "Are you leaving the premise?", "Do you want to use the elevator?", "To which floor you want to go?" or "Do you wish to use any facility in the premises" etc. Further, the prompt 600 depicts options for the user 108 to select an appropriate reponse to each of the questions. For an instance, the options may inlcude, but are not limited to, providing answers in "Yes" or "No" or may ask to choose "Specific Floor" or "Specific Facility" to be used. Although the prompt 600 depicts only a few questions; however, it is well understood by a person skilled in the art that any question may be asked to the user 108 for requesting information.

The present invention facilitates the user 102 with the service of automatically calling the elevator 114 only when the user 102 is privileged to use such services. The present invention further facilitates the user device 106 and/or the accessing device 104 to store one or more preferences of the user 108. Specifically, one or more preferences of the user 108 may include preference for using the elevator 114 and/or preference for specific floors like the floor having a swimming pool or gym or restaurant. Such preferences of the user 108 may be used to automatically call the elevator 114.

The present invention also encompasses the user device 106 to determine a time estimation for the user 108 to reach the elevator 114 and transmits such time determination to the accessing device 104C. The accessing device 104C sends this time determination to the server 112 and accordingly, the server 112 calls the elevator 114 based on this time determination. This time determination may be made based on a distance between the premises 102C where the user is present and the place where the elevator 114 is.

The present invention is applicable in various industries/fields such as, but not limited to, hospitality industry, housing industry, building/construction industry and any such industry/field that is well known in the art.

The present invention provides the following technical advantages over the existing methods and systems: a) reduces user's waiting time for calling the elevator, b) automatically calls the elevator based on information provided by the user, c) prompt the user to confirm the usage of elevator, d) confirms the user for exiting the premise, and e) provides automation for calling the elevator resulting in user's manual efforts for calling the elevator.

The embodiments of the invention discussed herein are exemplary and various modification and alterations to a known person skilled in the art are within the scope of the invention.

In one embodiment of the invention, the invention can be operated using the one or more computer readable devices comprising a computer readable medium. The one or more computer readable devices can be associated with the accessing devices 104. The computer readable medium of the computer readable devices is configured to advertise a state of the accessing device 104C associated with premises 102C and transmit the state of the accessing device 104C to the user device 106. The computer readable medium of the computer readable devices is also configured to receive a request along with information provided by a user 108 from the user device 106 to call an elevator 114. The accessing device 104C transmits the request along with the information provided by the user 108 to the server 112 for automatically calling the elevator 114.

In a different embodiment of the invention, the invention can be operated using the one or more computer readable devices comprising a computer readable medium. The one or more computer readable devices can be associated with the user device 106. The computer readable medium of the computer readable devices is configured to receive, from the accessing device 104C, a state of the accessing device 104C associated with the premises 102C and to prompt a user 108 of the user device 106 to provide information in response to receiving of the state. The computer readable medium of the computer readable devices is configured to transmit a request along with the information provided by the user 108 to the accessing device 104C for automatically calling the elevator 114.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles “a,” “an,” “the,” and “said” are intended to mean that there are one or more of the elements. The terms “comprising,” “including,” and “having” are intended to be inclusive and mean that there may be additional elements other than the listed elements. The term “exemplary” is intended to mean “an example of” The phrase “one or more of the following: A, B, and C” means “at least one of A and/or at least one of B and/or at least one of C”.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

I claim:

1. A method comprising:

advertising a state of an accessing device associated with a premises;

transmitting the state of the accessing device to a user device;

receiving at the accessing device from the user device, a request along with information provided by a user to call an elevator after transmitting the state; and relaying, using the accessing device as an intermediary between the user device and a server, the request and the information to the server through a service network for automatically calling the elevator, wherein the server communicates with a third party provider to initiate calling of the elevator based on the information, and wherein the third party provider comprises a service provider external to the premises.

2. The method of claim 1, wherein the state associated with the accessing device includes an open state or a close state of the accessing device.

3. The method of claim 1, wherein the information includes input provided by the user in response to a prompt by the user device.

4. A method comprising:

receiving, at a user device and from an accessing device, a state of the accessing device associated with a premises;

prompting, using the user device, a user of the user device to provide information in response to receiving the state of the accessing device associated with the premises; and transmitting a request along with the information provided by the user to the accessing device for automatically calling an elevator; and relaying, using the accessing device as an intermediary between the user device and the server, the request and the information to the server through a service network for automatically calling the elevator, wherein the server communicates with a third party provider to initiate calling of the elevator based on the information, and wherein the third party provider comprises a service provider external to the premises.

5. The method of claim 4, further comprising, estimating a time by the user device for the user to reach the elevator.

6. The method of claim 4, wherein the state associated with the accessing device includes an open state or a close state of the accessing device.

7. The method of claim 4, wherein the information includes input provided by the user in response to a prompt by the user device.

8. The method of claim 7, wherein the prompt includes one or more questions posed to the user with respect to the state.

9. The method of claim 8, wherein the questions posed to the user include a question related to use of the elevator, a question related to exit from the premises, a question related to a destination floor of the user, or a question related to using any facility in the premises.

10. A system comprising:

an accessing device including a transceiver configured to advertise a state of the accessing device associated with a premises and to transmit the state of the accessing device to a user device;

the user device including a receiver configured to receive, from the transceiver of the accessing device, a state associated with the accessing device;

an interface configured to prompt a user of the user device to provide information in response to receiving of the state;

a transmitter configured to transmit a request along with the information provided by the user to the accessing device for automatically calling an elevator; and a server, wherein the access device is configured to receive the request along with the information and to relay the request along with the information as an intermediary between the user device and the server to the server through a service network, and wherein the server is configured to communicate with a third party provider to initiate calling of the elevator based on the information, and wherein the third party provider comprises a service provider external to the premises.

11. The system of claim 10, wherein the state associated with the accessing device includes an open state or a close state of the accessing device; The system of claim 10, wherein the information includes input provided by the user in response to a prompt by the user device.

12. The system of claim 10, wherein the prompt includes one or more questions posed to the user with respect to the state.

13. The system of claim 12, wherein the questions posed to the user include a question related to use of the elevator, a question related to exit from the premises, a question related to a destination floor of the user, or a question related to using any facility in the premises.

14. The system of claim 13, wherein the accessing device receives the request along with the information and communicates the request along with the information to the server through a service network.

* * * * *